(12) United States Patent
Chand et al.

(10) Patent No.: US 9,788,079 B2
(45) Date of Patent: Oct. 10, 2017

(54) GENERATING ENHANCED ADVERTISEMENTS BASED ON USER ACTIVITY

(71) Applicants: Ashootosh Chand, Bangalore (IN); Bharathi Shekar, Bangalore (IN); Ankit Suchanti, Bangalore (IN); Yash Kotak, Bangalore (IN)

(72) Inventors: Ashootosh Chand, Bangalore (IN); Bharathi Shekar, Bangalore (IN); Ankit Suchanti, Bangalore (IN); Yash Kotak, Bangalore (IN)

(73) Assignee: RICOH CO., LTD., Tokyo (JP)

( * ) Notice: Subject to any disclaimer, the term of this patent is extended or adjusted under 35 U.S.C. 154(b) by 39 days.

(21) Appl. No.: 14/198,490

(22) Filed: Mar. 5, 2014

(65) Prior Publication Data
US 2015/0256899 A1  Sep. 10, 2015

(51) Int. Cl.
| | | |
|---|---|---|
| *H04N 7/10* | (2006.01) | |
| *H04N 7/025* | (2006.01) | |
| *H04N 21/81* | (2011.01) | |
| *H04N 21/258* | (2011.01) | |
| *H04N 21/45* | (2011.01) | |
| *H04N 21/4223* | (2011.01) | |
| *H04N 21/235* | (2011.01) | |
| *H04N 21/25* | (2011.01) | |

(Continued)

(52) U.S. Cl.
CPC ......... *H04N 21/812* (2013.01); *H04N 21/235* (2013.01); *H04N 21/252* (2013.01); *H04N 21/25891* (2013.01); *H04N 21/41407* (2013.01); *H04N 21/4223* (2013.01); *H04N 21/435* (2013.01); *H04N 21/44222* (2013.01); *H04N 21/454* (2013.01); *H04N 21/4532* (2013.01); *H04N 21/4667* (2013.01); *H04N 21/4725* (2013.01); *H04N 21/84* (2013.01); *H04N 21/4126* (2013.01)

(58) Field of Classification Search
CPC ........... H04N 21/812; H04N 21/25883; H04N 21/25891; H04N 21/4532; H04N 7/17309; H04N 21/4113; H04N 21/4126; H04N 21/4143; H04N 21/4223; H04N 21/26241; H04N 21/235; H04N 21/84; H04N 21/41407; H04N 21/435; H04N 21/44222; H04N 21/454; H04N 21/4667; H04N 21/4725; H04N 21/252
USPC ......................................... 725/32, 34, 42, 60
See application file for complete search history.

(56) References Cited

U.S. PATENT DOCUMENTS

| | | | |
|---|---|---|---|
| 6,236,978 B1 * | 5/2001 | Tuzhilin | ........................ 705/7.29 |
| 6,477,508 B1 * | 11/2002 | Lazar | ................. G06Q 30/0601 |
| | | | 348/E7.071 |

(Continued)

*Primary Examiner* — Nnenna Ekpo
(74) *Attorney, Agent, or Firm* — Patent Law Works LLP

(57) ABSTRACT

The disclosure includes a system and method selecting advertisements for users based on image capturing patterns across different media. A media application receives a captured image including information about a product from a user, identifying an indexed image matching the captured image including information about the product, retrieving metadata describing the captured image including information about the product responsive to identifying the indexed image, retrieving a user profile stored for the user, identifying an advertisement from a set of advertisements based on the user profile and the metadata describing the captured image including information about the product and providing the user with the advertisement based on the user profile.

14 Claims, 7 Drawing Sheets

(51) Int. Cl.

| | |
|---|---|
| *H04N 21/414* | (2011.01) |
| *H04N 21/435* | (2011.01) |
| *H04N 21/442* | (2011.01) |
| *H04N 21/454* | (2011.01) |
| *H04N 21/466* | (2011.01) |
| *H04N 21/4725* | (2011.01) |
| *H04N 21/84* | (2011.01) |
| *H04N 21/41* | (2011.01) |

(56) References Cited

U.S. PATENT DOCUMENTS

| | | | | |
|---|---|---|---|---|
| 8,635,537 | B1* | 1/2014 | Kan | G06Q 20/32 |
| | | | | 705/14.4 |
| 2007/0220575 | A1* | 9/2007 | Cooper | H04N 7/1675 |
| | | | | 725/118 |
| 2008/0065507 | A1* | 3/2008 | Morrison | G06Q 30/0613 |
| | | | | 705/26.3 |
| 2009/0204479 | A1* | 8/2009 | Wolinsky et al. | 705/10 |
| 2011/0255736 | A1* | 10/2011 | Thompson et al. | 382/100 |
| 2011/0295693 | A1* | 12/2011 | Clavin et al. | 705/14.66 |
| 2011/0307411 | A1* | 12/2011 | Bolivar | G06Q 30/0282 |
| | | | | 705/347 |
| 2011/0320263 | A1* | 12/2011 | Yamada | G06Q 30/0246 |
| | | | | 705/14.45 |
| 2012/0116875 | A1* | 5/2012 | Wang | G06Q 30/02 |
| | | | | 705/14.53 |
| 2012/0167146 | A1* | 6/2012 | Incorvia | H04N 21/234318 |
| | | | | 725/60 |
| 2013/0097002 | A1* | 4/2013 | Dishneau | G06Q 30/0255 |
| | | | | 705/14.25 |
| 2014/0009680 | A1* | 1/2014 | Moon et al. | 348/563 |

* cited by examiner

GENERATING ENHANCED ADVERTISEMENTS BASED ON USER ACTIVITY

BACKGROUND OF THE INVENTION

1. Field of the Invention

The specification relates to selecting advertisements for users based on image capturing patterns across different media. In particular, the specification relates to a system and method for identifying advertisements based on the user profile and metadata associated with captured images.

2. Description of the Background Art

Advertising media as is for marketing products is static and generic. Users are left with no choice but to treat advertising media as a one-way communication. Personalization of advertisements for consumers is non-existent. This leads to poor monetization through advertisement and product placement and fails to engage the consumers effectively.

SUMMARY OF THE INVENTION

The disclosure includes a system and method for delivering targeted advertisement. In one embodiment, the system includes a media application. The media application receives a captured image including information about a product from a user, identifying an indexed image matching the captured image including information about the product, retrieving metadata describing the captured image including information about the product responsive to identifying the indexed image, retrieving a user profile stored for the user, identifying an advertisement from a set of advertisements based on the user profile and the metadata describing the captured image including information about the product and providing the user with the advertisement based on the user profile.

Other aspects include corresponding methods, systems, apparatuses, and computer program products for these and other innovative aspects.

The specification advantageously describes technology for delivering targeted advertisement by increasing user engagement. As a result, this allows for the seamless integration of advertisements across different advertising media. Furthermore, the monetization through targeted advertisements is dynamic by analyzing user interests and buying habits.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
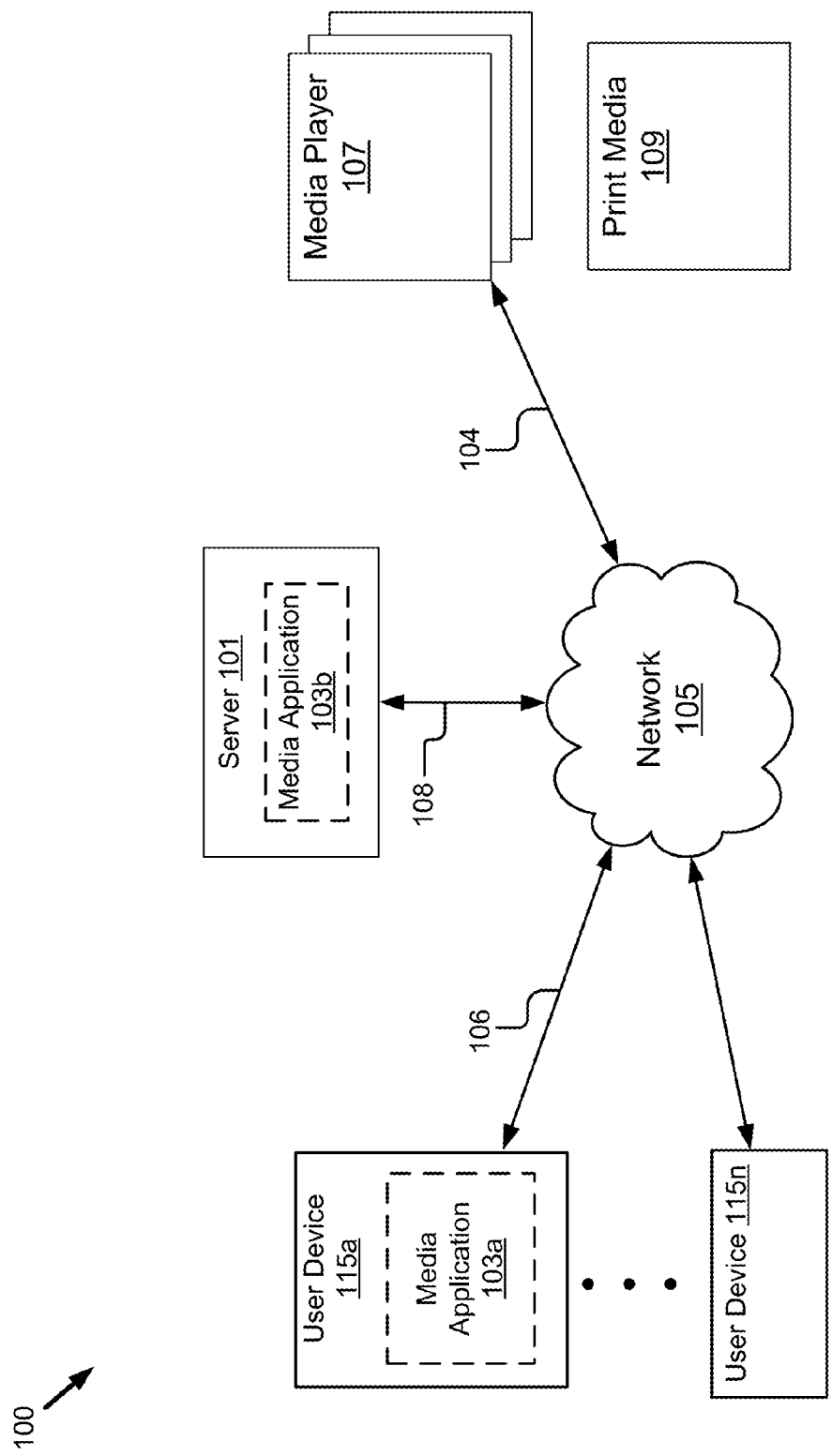
FIG. 1 is a high-level block diagram illustrating one embodiment of a system for grouping users for delivering targeted advertisements.

A system and method for grouping users into one or more categories for delivering targeted advertisements is described. In the following description, for purposes of explanation, numerous specific details are set forth in order to provide a thorough understanding of the invention. It will be apparent, however, to one skilled in the art that the embodiments can be practiced without these specific details. In other instances, structures and devices are shown in block diagram form in order to avoid obscuring the invention. For example, the invention is described in one embodiment below with reference to user devices such as a smart phone and particular software and hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable medium providing program code for use by or in connection with a computer or any instruction execution system. For the purposes of this invention, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

System Overview

FIG. 1 illustrates a block diagram of a system 100 for categorizing users into one or more groups and determining targeted advertisements for delivery. The illustrated system 100 includes user devices 115*a* . . . 115*n* that can be accessed by users and a server 101. In FIG. 1 and the remaining figures, a letter after a reference number, e.g., "115*a*," represents a reference to the element having that particular reference number. A reference number in the text without a following letter, e.g., "115," represents a general reference to instances of the element bearing that reference number. In the illustrated embodiment, these entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the user devices 115 and the server 101, in practice one or more networks 105 can be connected to these entities.

The media player 107 may be a computing device including a processor, a memory and communication capabilities. In one embodiment, the media player 107 receives and playbacks multimedia content including audio and video, and is coupled to the network 105 via signal line 104. The media player 107 receives input commands from the user to play, pause or stop the playback of multimedia content. For example, the media player 107 can be a television including a set top box capable of receiving and playing back content, such as movies, sitcoms, news, etc. from content sources (i.e., basic cable, premium cable, satellite television, etc.) over the network 105. In another embodiment, the media player 107 does not have a monitor for outputting content. Accordingly, in some embodiments the media player 107 is communicatively coupled to a monitor for outputting the content for display to the user. For example, the media player 107 can be a Blu-Ray™ device for playback of high-definition content, a game console for high-definition interactive gameplay or for playback of high-definition content through on-demand internet streaming (i.e., Netflix™, Amazon™, etc.) over the network 105. In one embodiment, the user devices 115*a* . . . 115*n* capture images of content displayed by the media player 107. For example, capturing an image of a climactic scene from an action movie, capturing an advertisement for car insurance, etc.

In one embodiment, the print media 109 can be a paper document reproducing text and images in ink for user consumption. For example, the print media 109 can be a news magazine, a fashion magazine, a sports magazine, a tabloid magazine, a newspaper, a journal, etc. In one embodiment, the user devices 115*a* . . . 115*n* capture images of content displayed on print media 109. For example, capturing an image of a 2014 electric car advertisement in a daily newspaper, capturing an image of a celebrity wearing a fashion leather jacket, etc.

In one embodiment, the media application 103*a* may be operable on a user device 115*a*, which is connected to the network 105 via signal line 106. In one embodiment, the user device 115*a*, 115*n* may be a computing device that includes a memory, a processor and a camera, for example a laptop computer, a desktop computer, a tablet computer, a mobile telephone, a smartphone, a personal digital assistant (PDA), a mobile email device, a webcam, a digital set top box (STB), digital video recorder (DVR), connected television or any other electronic device capable of accessing a network 105. The user device 115 includes a display for viewing information provided by the server 101. The user devices 115a, 115n in FIG. 1 are used by way of example. While FIG. 1 illustrates two user devices 115a and 115n, the disclosure applies to a system architecture having one or more user devices 115.

In one embodiment, the media application 103b may be operable on the server 101, which is coupled to the network 105 via signal line 108. The server 101 may be a computing device including a processor, a memory and network communication capabilities. The server 101 sends and receives data to and from other entities of the system 100 via the network 105. In one embodiment, the server 101 can be an advertisement server that receives and stores advertisements for marketing a variety of product categories. The server 101 delivers the advertisements to the target users who have expressed interest in one or more product categories. For example, the server 101 receives data including a captured image of a wrist watch worn by an actor on a video channel from the user device 115 and sends targeted advertisement associated with the captured image of the wrist watch to the user device 115. In another example, the server 101 receives data including a captured image of a smartphone advertisement in a magazine from the user device 115 and provides additional information related to the smartphone advertisement to the user device 115. In one embodiment, the images received by the server 101 can also include an image copied from a website or an email or an image from any other source. While FIG. 1 includes one server 101, the system 100 may include one or more servers 101. The server 101 also includes a data storage 243, which is described below in more detail with reference to FIG. 2.

In one embodiment, the media application 103 acts as a thin-client application that may be stored in part on the user device 115 and in part as components of the server 101. For example, the media application 103a on the user device 115 could include software for capturing the image and, in some embodiments, identify a product in the captured image. The media application 103b on the server 101 matches the product identified to retrieve targeted advertisements.

The media application 103 is code and routines for grouping users into one or more categories for delivering targeted advertisements. In one embodiment, the media application 103 can be implemented using hardware including a field-programmable gate array (FPGA) or an application-specific integrated circuit (ASIC). In another embodiment, the media application 103 can be implemented using a combination of hardware and software. In yet another embodiment, the media application 103 may be stored in a combination of the devices and servers, or in one of the devices or servers.

In one embodiment, the media application 103 receives a captured image from a user, identifies an indexed image matching the captured image, retrieves metadata describing the captured image responsive to identifying the indexed image, generates a user profile for the user based on the metadata describing the captured image and a history of at least one previously captured image associated with the user, identifies a product in the captured image based on the metadata describing the captured image, provides the user with information about the product, updates the user profile based on how the user interacts with the product, and categorizes the user into one or more groups based on the user profile.

In one embodiment, the media application 103 receives a captured image including a product from a user, identifies an indexed image matching the captured image including the product, retrieves metadata describing the captured image including the product responsive to identifying the indexed image, retrieves a user profile stored for the user, identifies an advertisement from a set of advertisements based on the user profile and the metadata describing the captured image including the product and provides the user with the advertisement based on the user profile.

In one embodiment, the captured image is of content displayed on a first user device and captured on a second user device; the captured image is of content displayed on a printed advertising medium and captured on a mobile device; the user profile stored for the user includes age, gender, location, timestamp of at least one previously captured image, metadata of the at least one previously captured image, history of products previously interacted with by the user, history of products previously purchased by the user and time spent by the user shopping for products; the metadata describing the captured image includes a time and location associated with the captured image, a genre of the captured image, a type of advertising medium associated with the captured image, a name of advertising medium associated with the captured image, and a name of the product in the captured image, providing the user with the advertisement based on the user profile further comprises selecting a time for delivering the advertisement for effective user engagement. The media application 103 provides the user with the advertisement based on the user profile further comprises associating the user profile with an adopter category and provides the advertisement based on the adopter category identified for the user profile; and the adopter category includes one from a group of early adopters, early majority, late majority and laggards. The media application 103 is described below in more detail with reference to FIG. 2.

Media Application

Figure 2:
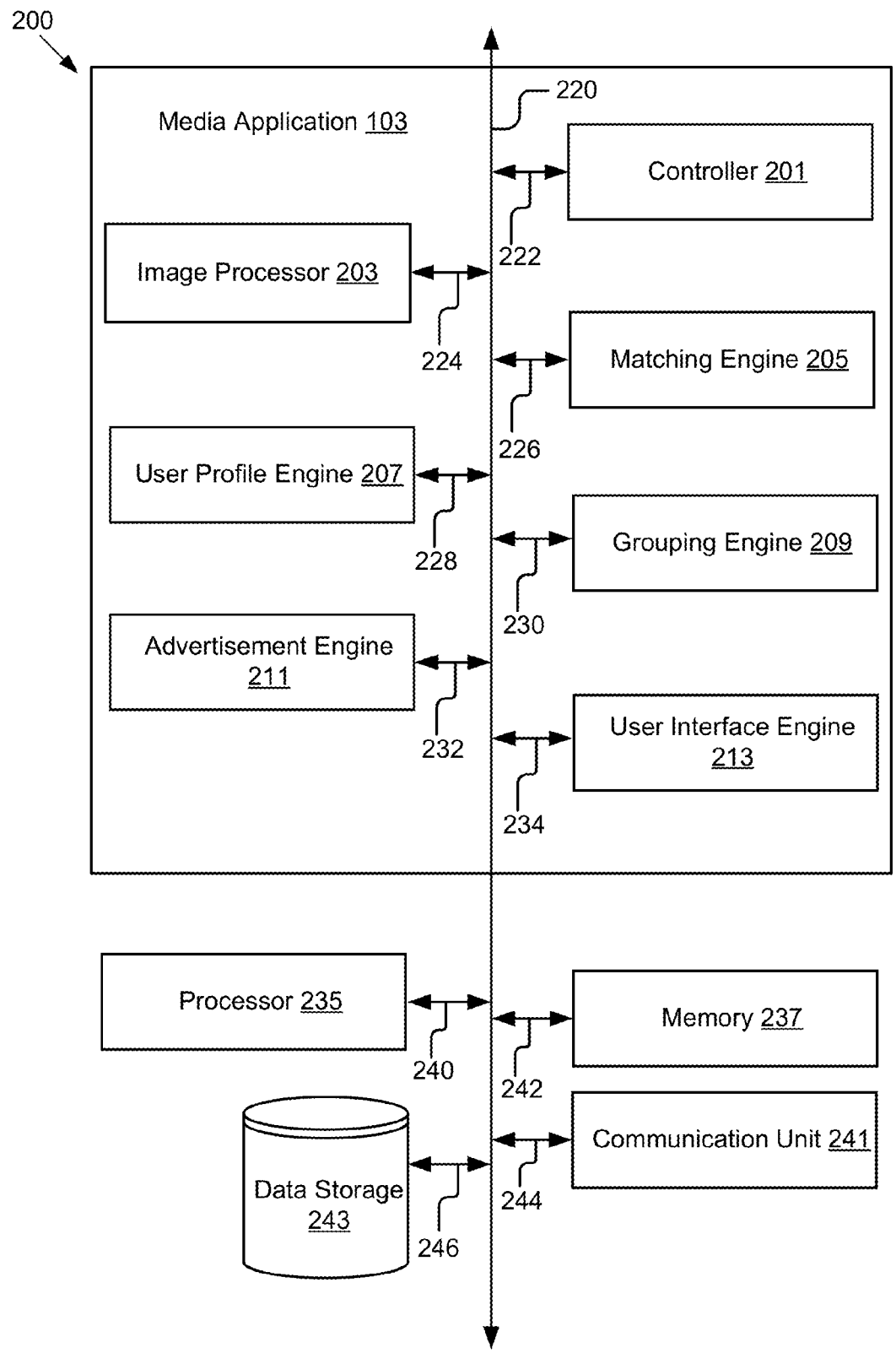
FIG. 2 is a block diagram illustrating one embodiment of a media application.

Referring now to FIG. 2, an example of the media application 103 is shown in more detail. FIG. 2 is a block diagram of a computing device 200 that includes a media application 103, a processor 235, a memory 237, a communication unit 241 and data storage 243 according to some examples. The components of the computing device 200 are communicatively coupled by a bus 220. The bus 220 may represent one or more buses including an industry standard architecture (ISA) bus, a peripheral component interconnect (PCI) bus, a universal serial bus (USB), or some other bus known in the art to provide similar functionality. In some embodiments, the computing device 200 can be one of a user device 115 and a server 101.

The processor 235 includes an arithmetic logic unit, a microprocessor, a general purpose controller or some other processor array to perform computations and to optionally provide electronic display signals to a display device. The processor 235 is coupled to the bus 220 for communication with the other components via signal line 240. The processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that can be executed by the processor 235. The memory 237 is coupled to the bus 220 for communication with the other components via signal line 242. The instructions and/or data may include code for performing the techniques described herein. The memory 237 may be a dynamic random access memory (DRAM) device, a static random access memory (SRAM) device, flash memory or some other memory device known in the art. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 is hardware for receiving and transmitting data by linking the processor 235 to the network 105 and other processing systems. The communication unit 241 receives data such as requests from the user device 115 and transmits the requests to components of the media application 103. The communication unit 241 also transmits additional information including targeted advertisements to the user device 115 for display, for example, in response to receiving a captured image of a product advertisement in print or video. The communication unit 241 is coupled to the bus 220 via signal line 244. In one embodiment, the communication unit 241 includes a port for direct physical connection to the user device 115 or to another communication channel. For example, the communication unit 241 includes an RJ45 port or similar port for wired communication with the user device 115. In another embodiment, the communication unit 241 includes a wireless transceiver (not shown) for exchanging data with the user device 115 or any other communication channel using one or more wireless communication methods, such as IEEE 802.11, IEEE 802.16, Bluetooth® or another suitable wireless communication method.

In one embodiment, the communication unit 241 includes a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. In another embodiment, the communication unit 241 includes a wired port and a wireless transceiver. The communication unit 241 also provides other conventional connections to the network 105 for distribution of files and/or media objects using standard network protocols such as TCP/IP, HTTP, HTTPS and SMTP as will be understood to those skilled in the art.

The data storage 243 is a non-transitory memory that stores data for providing the functionality described herein. The data storage 243 may be a dynamic random access memory (DRAM) device, a static random access memory (SRAM) device, flash memory or some other memory devices. In one embodiment, the data storage 243 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In the illustrated embodiment, the data storage 243 is communicatively coupled to the bus 220 via signal line 246. In one embodiment, the data storage 243 stores the user profiles of the users capturing images. In one embodiment, the data storage 243 stores the categories of user profiles for delivering targeted advertisement for effective product advertising. In one embodiment, the data storage 243 stores the metadata describing the captured images. In another embodiment, the data storage 243 stores the data in Extensible Markup Language (XML) file format.

In one embodiment, the media application 103 includes a controller 201, an image processor 203, a matching engine 205, a user profile engine 207, an optional grouping engine 209, an advertisement engine 211, and a user interface engine 213. The components of the media application 103 are communicatively coupled via the bus 220.

The controller 201 can be software including routines for handling communications between the media application 103 and other components of the computing device 200. In one embodiment, the controller 201 can be a set of instructions executable by the processor 235 to provide the functionality described below for handling communications between the media application 103 and other components of the computing device 200. In another embodiment, the controller 201 can be stored in the memory 237 of the computing device 200 and can be accessible and executable by the processor 235. In either embodiment, the controller 201 can be adapted for cooperation and communication with the processor 235 and other components of the computing device 200 via signal line 222.

In one embodiment, the controller 201 sends and receives data, via the communication unit 241, to and from one or more of user devices 115 and the server 101. For example, the controller 201 receives, via the communication unit 241 a captured image from a user device 115 operated by a user and sends the image to the matching engine 205. In another example, the controller 201 receives graphical data for providing a user interface to a user from the user interface engine 213 and sends the graphical data to a user device 115, causing the user device 115 to present the user interface to the user.

In one embodiment, the controller 201 receives data from other components of the media application 103 and stores the data in the data storage 243. For example, the controller 201 receives data including metadata of captured images from the image processor 203 and stores the data in the data storage 243. In another embodiment, the controller 201 retrieves data from the data storage 243 and sends the data to other components of the media application 103. For example, the controller 201 retrieves data including user profiles from the data storage 243 and sends the retrieved data to the grouping engine 209.

The image processor 203 can be software including routines for receiving and processing images for indexing and recognition. In one embodiment, the image processor 203 can be a set of instructions executable by the processor 235 to provide the functionality described below for processing the images for indexing and recognition. In another embodiment, the image processor 203 can be stored in the memory 237 of the computing device 200 and can be accessible and executable by the processor 235. In either embodiment, the image processor 203 can be adapted for cooperation and communication with the processor 235, the matching engine 205 and other components of the computing device 200 via signal line 224.

In one embodiment, the image processor 203 receives images of content from a user administrator. The content can be associated with an advertising medium. The advertising medium can be any medium (print or video) through which an advertisement for a product is shown. For example, the images can be image frames from a car insurance advertisement on basic cable, a television drama episode on prime cable, a video clip on a video sharing website, a stream of an on-demand internet streaming media provider, a video playback of a Blu-Ray™ disc, etc. In another example, the images can be one of an image of a tablet PC advertisement page on a paper magazine, a front cover of a book, an article in a newspaper, etc.

In one embodiment, the image processor 203 requests the user to add information about the image as metadata for storing in the data storage 243. For example, the name, type (daily newspaper, weekly magazine, basic cable, premium cable, etc.) and genre (business magazine, sports magazine, documentary channel, drama television channel, action movies, etc.) of the advertising medium from which the image is captured, the product identified in the image (e.g., car, clothing suit and sunglasses worn by a model, hand bag and earrings worn by an actress, etc.). In another embodiment, the image processor 203 identifies the metadata from the image itself. For example, the image processor 203 detects logo of the video channel in a received image frame, determines the season and episode of the television drama, identifies the wardrobe worn by actors in that episode, etc. and associates such information as metadata of the received image. In another example, the image processor 203 detects a brand name of a watch from the received image of a newspaper advertisement, determines the name of the newspaper, page number of the advertisement in the newspaper, etc. and associates such information as metadata of the received image. In one embodiment, the image processor 203 categorizes one or more products identified in the image as metadata. For example, images including clothing, watches, sunglasses, handbag, etc. are categorized as belonging to the fashion category in the metadata, images including cars, motorbikes, boats, etc. are categorized as belonging to the vehicle category, and images including smartphones, tablet PCs, wearable gadgets, etc. are categorized as belonging to the hardware category in the metadata, etc.

In one embodiment, the image processor 203 indexes the received images including the identified products, product categories and other identified metadata in the data storage 243. The indexing of the received images makes them searchable during image matching against captured images by one or more users. In one embodiment, the image processor 203 maps each image to a set of values, such as, product name, advertising medium, brand name, genre, etc. in Extensible Markup Language (XML) file format.

In one embodiment, the image processor 203 sends data including the indexed set of images along with the associated metadata describing the set of images to the matching engine 205. In another embodiment, the image processor 203 stores the data including the indexed set of images along with the associated metadata describing the set of images in the data storage 243. In one embodiment, each frame of a video is indexed. In another embodiment, unique frames of a video are indexed. For example, the data storage 243 indexes images when there is a threshold difference between frames, such as a video of a person walking as opposed to a five second still shot of an object. Persons of ordinary skill in the art will recognize that many different types of indexing techniques are possible.

The matching engine 205 can be software including routines for identifying a captured image and retrieving metadata describing the captured image. In one embodiment, the matching engine 205 can be a set of instructions executable by the processor 235 to provide the functionality described below for matching a captured image. In another embodiment, the matching engine 205 can be stored in the memory 237 of the computing device 200 and can be accessible and executable by the processor 235. In either embodiment, the matching engine 205 can be adapted for cooperation and communication with the processor 235, the image processor 203, the user profile engine 207 and other components of the computing device 200 via signal line 226.

In one embodiment, the matching engine 205 receives a captured image from a user including a time and location of capture. In one embodiment, the captured image can be received from the user device 115, for example, a smartphone, a tablet PC, etc. and may include one or more products. For example, the captured image could be an image frame from a television drama showing an actress with a handbag on the television. In another embodiment, the captured image could be captured directly from the media player 107, for example, if the user is viewing a video on a smartphone. In another example, the captured image could be an image of an advertisement for a formal wrist watch in a daily newspaper. The matching engine 205 identifies an indexed image in the data storage 243 matching the captured image. In another embodiment, the matching engine 205 retrieves metadata from the data storage 243 describing the captured image and associating the metadata with the captured image. For example, the matching engine 205 identifies the captured image of an actress in a television drama and associates it with retrieved metadata. The metadata describes that the captured image is from Season 3, Episode 2, broadcast on A2B channel, at 9 PM Eastern Standard Time, the identified product in the captured image is a Louis Vuitton™ handbag, etc. In another example, the matching engine 205 identifies the captured image of an advertisement for a formal wrist watch and associates it with retrieved metadata. The metadata describes that the captured image is from page 5 of a daily newspaper XYZ Herald dated Sunday 12 Jan. 2014, advertising about PQR wrist watch, and the image was captured at 09:15 AM, etc.

In one embodiment, the matching engine 205 sends data including the captured image matching the indexed image along with the associated metadata describing the captured image to the user profile engine 207 for generating a user profile. The user profile engine 207 is explained in more detail below. In another embodiment, the matching engine 205 sends the data including the captured image matching the indexed image along with the associated metadata describing the captured image to the advertisement engine 211 for delivering targeted advertisements in response. The advertisement engine 211 is explained in more detail below. In yet another embodiment, the matching engine 205 stores the data including the identified image including products in the data storage 243.

The user profile engine 207 can be software including routines for generating and updating user profiles for users capturing images. In one embodiment, the user profile engine 207 can be a set of instructions executable by the processor 235 to provide the functionality described below for generating and updating the user profiles. In another embodiment, the user profile engine 207 can be stored in the memory 237 of the computing device 200 and can be accessible and executable by the processor 235. In either embodiment, the user profile engine 207 can be adapted for cooperation and communication with the processor 235, the image processor 203, the matching engine 205, the grouping engine 209 and other components of the computing device 200 via signal line 228.

In one embodiment, the user profile engine 207 generates user profiles for users based on their pattern in capturing images across the advertising media. In one embodiment, the user profile engine 207 receives an identification of a captured image associated with a user from the matching engine 205 and generates a user profile for the user capturing the image. The user profile built for the user primarily includes user demographics, user interests and product buying habits. In another embodiment, the user profile engine 207 generates a user profile for the user based on receiving user input at a time of initial user registration. For example, the user profile engine 207 receives age, gender and location of the user at the initial user registration and adds such demograph information to the user profile. In one embodiment, the user profile engine 207 infers an interest of the user in a particular subject or entity from identifying a pattern in which the user captures images across the print and video media. The user profile engine 207 generates a user profile for the user based on the metadata of the captured images. The user profile engine 207 stores information about the images previously captured by the user including the associated metadata in the user profile. For example, the user profile engine 207 identifies that a user captures images of actors with fashionable attire and accessories broadcast on a television channel. The user profile engine 207 stores information about the captured images including metadata in the user profile of that user inferring that the user is interested in fashion. In another example, the user profile engine 207 identifies that a user captures images that are of articles or advertisement pages from a technology magazines that include images of wearable fitness devices. The user profile engine 207 stores the captured images including metadata in the user profile of that user inferring that the user is interested in wearable fitness devices and, based on a trend, an early adopter of technology. In one embodiment, the user profile engine 207 retrieves the stored user profile in response to receiving a captured image from the user.

In one embodiment, the user profile engine 207 updates the user profile for a user based on feedback information received from the advertisement engine 211. The advertisement engine 211 retrieves information about a product identified in a captured image by the user and delivers product advertisements to the user in response to the captured image. The advertisement engine 211 is explained in greater detail below. In one embodiment, the user profile engine 207 determines how the user interacts with an advertised product from the feedback information received from the advertisement engine 211 and updates the user profile accordingly. For example, if the user clicks on advertised products, the user profile engine 207 stores the click history associated with the advertised products in the user profile. In another example, if the user buys the advertised products, the user profile engine 207 stores the purchase history associated with the advertised products and buying habits associated with the user in the user profile. In another embodiment, the user profile engine 207 monitors any subsequent activity of the user starting from capturing an image to clicking on an advertised product associated with the captured image and updates the user profile accordingly. For example, the user profile engine 207 determines how much time the user spent buying an advertised product, how the user went about selecting a particular advertised product out of others to buy, etc. In another example, the user profile engine 207 determines how much time elapsed between the user capturing an image and clicking on an advertised product associated with the captured image. The user profile engine 207 infers the user's interest in the advertised product or brand based on whether the elapsed time is shorter or longer.

In one embodiment, the user profile engine 207 sends the user profiles to the grouping engine 209 for categorizing the user profiles into one or more groups. In another embodiment, the user profile engine 207 stores the data including the user profiles generated in the data storage 243.

The grouping engine 209 can be software including routines for grouping user profiles into one or more categories. In one embodiment, the grouping engine 209 can be a set of instructions executable by the processor 235 to provide the functionality described below for grouping the user profiles. In another embodiment, the grouping engine 209 can be stored in the memory 237 of the computing device 200 and can be accessible and executable by the processor 235. In either embodiment, the grouping engine 209 can be adapted for cooperation and communication with the processor 235, the user profile engine 207, the advertisement engine 211 and other components of the computing device 200 via signal line 230.

In one embodiment, the grouping engine 209 receives a user profile generated for a user by the user profile engine 207 and categorizes the user into one or more groups based on the user profile.

In one embodiment, the grouping engine 209 categorizes the user profiles based on the users' interest in one or more products as identified from their user profiles. For example, users engaged in capturing images relating to fashion and accessories, such as, clothing, earrings, watch, handbag, gloves, sunglasses, etc. can be categorized as a group interested in fashion. In another example, users engaged in capturing images relating to a particular genre of entertainment, such as, action movies, can be categorized as a group interested in action movie genre or that television channel showing action movies. In a third example, users engaged in capturing images relating to articles, advertisement, cover page, etc. in a business magazine can be categorized as a group interested in business.

In one embodiment, the grouping engine 209 categorizes the user profiles based on the users' preferred advertising medium to use for capturing images from as identified through their user profiles. For example, users predominantly engaged in capturing images from video such as, premium cable dramas, on-demand internet streaming websites, video sharing websites, etc. can be categorized as belonging to a group that prefers video as a medium. In another example, users predominantly engaged in capturing images from books, magazines, newspapers, etc. can be categorized as belonging to a group that prefers print as a medium. In another embodiment, the grouping engine 209 categorizes the user profiles based on the users' preference of an individual advertising channel in their already preferred medium to capture images. For example, user profiles that indicate the captured images as being from product advertisements shown during a comedy sitcom can be categorized as a group that watches that comedy sitcom. In another example, user profiles that indicate the captured images as being from product advertisement pages from a business magazine can be categorized as group that reads that business magazine. As a third example, user profiles can also be further categorized as a group that watches comedy sitcoms only on A2B channel or a group that reads business articles only on Richie business magazine.

In one embodiment, the grouping engine 209 categorizes the user profiles based on the users' time of engagement with an advertising medium for capturing images as identified from their user profiles. For example, users engaged in watching prime time television from 7 PM-10 PM and capturing images of programs, product advertisements, etc.

broadcast during that time period can be categorized as a prime-time group. In another example, users engaged in watching news in the early morning between 6 AM-10 AM and capturing images of programs, product placements, etc. broadcast during that time period can be categorized as an early morning group.

In one embodiment, the grouping engine 209 categorizes the users based on their product buying habits and patterns as identified through the user profiles. For example, the grouping engine 209 identifies that some users buy a product that is advertised in response to whenever receiving a captured image from the user. The grouping engine 209 categorizes such users as being part of an aggressive buyers group. In another example, the grouping engine 209 identifies that some users buy the product when it is advertised only after a third or a fourth time. The grouping engine 209 categorizes such users as being part of a cautious buyers group or a thoughtful buyers group.

In one embodiment, the grouping engine 209 categorizes the users based on determining the users' rate of adopting products and technology as identified from their user profiles. In one embodiment, the grouping engine 209 categorizes the users into a group from one of the following: early adopters, early majority, late majority and laggards. For example, the grouping engine 209 identifies that some users express interest in a particular product or product category by capturing images, receiving information about the product or category, and quickly making a purchase whenever an advertisement for the product is delivered or on a launch date for the product. The grouping engine 209 determines that such users are predominantly younger who closely follow the particular product or product category and categorizes such users as an "early adopters" group. In a second example, the grouping engine 209 identifies that some users express interest in the product by capturing images and buying the product only after a varying degree of time (significantly longer than the early adopters group). The grouping engine 209 categorizes such users as an early majority group. In a third example, the grouping engine 209 identifies that some users buy the product after the average member of the population has already adopted the product. The grouping engine 209 categorizes such users as a late majority group. In a fourth example, the grouping engine 209 identifies that some users are always the last to adopt a particular product or category. The grouping engine 209 determines that such users are predominantly advanced in age and averse to change. The grouping engine 209 categorizes such users as laggards.

In one embodiment, the grouping engine 209 sends the categorization of users into groups to the advertisement engine 211 for delivering targeted advertisements. In another embodiment, the grouping engine 209 stores the categorization of users into groups in the data storage 243.

The advertisement engine 211 can be software including routines for delivering targeted advertisements in response to users capturing images. In one embodiment, the advertisement engine 211 can be a set of instructions executable by the processor 235 to provide the functionality described below for delivering targeted advertisements. In another embodiment, the advertisement engine 211 can be stored in the memory 237 of the computing device 200 and can be accessible and executable by the processor 235. In either embodiment, the advertisement engine 211 can be adapted for cooperation and communication with the processor 235, the matching engine 205, the user profile engine 207, the grouping engine 209 and other components of the computing device 200 via signal line 232.

In one embodiment, the advertisement engine 211 receives an identification of the image captured by a user from the matching engine 205. The identification includes retrieved metadata describing the captured image. In one embodiment, the advertisement engine 211 provides the user with information about one or more products identified in the captured image based on the metadata describing the captured image. The image can include the product itself or other information about the product, such as text identifying a product. For example, if the captured image is of a smartphone advertisement off the video medium, the advertisement engine 211 retrieves information including the technological specification, launch date, price, retailer, etc. associated with the smartphone product and displays the retrieved information on the user device 115. In another embodiment, the advertisement engine 211 instructs the user interface 211 to display the information about one or more products identified in the captured image by generating hotspots on the captured image and linking the identified products to the retrieved information. For example, if the captured image is from a newspaper advertisement of a car insurance agent posing with a car, the advertisement engine 211 creates hotspots on clear, visible spots on the car to provide information about the car insurance's website, location address, telephone number, additional videos, etc.

In one embodiment, the advertisement engine 211 personalizes and selects one or more advertisements from a set of advertisements to deliver to the user capturing images based on the user profile of the user and metadata describing the captured image. In one embodiment, the advertisements relate to one or more identified products in the captured image. In another embodiment, the advertisements are opportunistic and contextual to the theme of the captured image. For example, the advertisement engine 211 identifies that a user regularly watches stock market news analysis in the evening from 6 PM-9 PM based on his user profile. If the user is watching a movie based on his recent image capture received between 6 PM-9 PM on some occasion, the advertisement engine 211 delivers an advertisement, such as ticket advertisements, movie DVDs, etc. during that time period for movies with "Wall Street" themes to woo the user currently engaged in watching movies who otherwise is uninterested in movies. In one embodiment, the advertisement engine 211 personalizes and selects the advertisements for delivery based on the user demographics identified from the user profile. For example, the advertisement engine 211 delivers one advertisement that is personalized for a 24 year old car owner and another advertisement that is personalized for a 55 year old car owner based on each capturing an image of the car insurance advertisement page in the newspaper. In another example, the advertisement engine 211 delivers an advertisement for a handbag shopper based in Boston with contact information of the local handbag branch in Boston and not San Francisco's branch.

In one embodiment, the advertisement engine 211 determines a user's time watching a television show, time watching one television channel, time of capturing images during the television show, genre interests, etc. based on the user profile. In one embodiment, the advertisement engine 211 identifies an opportune time for delivering the advertisement to the user to ensure optimal user engagement and effective advertising based on the determined inferences from the user profile and the metadata retrieved for the captured image. For example, the advertisement engine 211 delivers targeted advertisements to the user anytime during an hour long television show. In another example, the advertisement engine 211 delivers targeted advertisements to the user during advertisement breaks of the hour long show. In yet another example, the advertisement engine 211 delivers targeted advertisements to the user at the end of the hour long show. In another embodiment, the advertisement engine 211 identifies a user's mood based on the user profile and the metadata retrieved for the captured image and delivers advertisements based on the user's mood. For example, the advertisement engine 211 determines that the user is currently watching a romantic movie and delivers advertisements for romantic movie recommendations, dating websites, etc. to the user.

In one embodiment, the advertisement engine 211 receives user profiles categorized into one or more groups from the grouping engine 209 and delivers advertisements targeting the groups. In one example, the advertisement engine 211 delivers an advertisement for a new room spray product to users categorized in the "aggressive buyers" group for buying an advertised product quickly. In another example, the advertisement engine 211 delivers an advertisement for a new platform-based smartphone to users categorized in the "early adopters" group for closely following smartphone industry. In a third example, the advertisement engine 211 delivers an advertisement for a new breakfast menu to users categorized in the "early morning" group for engaging in watching product placement advertisements in early morning video viewing hours.

In one embodiment, the advertisement engine 211 provides feedback information to the user profile engine 207 responsive to the user clicking and/or buying the advertised products. The feedback information includes time spent buying an advertised product, the advertised product that was bought, when the advertised product was bought, etc. In one embodiment, the user profile engine 207 updates the user profiles based on the feedback information received from the advertisement engine 211.

In one embodiment, the advertisement engine 211 sends the data including the advertisements to the user interface engine 213 for generating a user interface to deliver the advertisements. In another embodiment, the advertisement engine 211 stores the data including the advertisements in the data storage 243.

The user interface engine 213 is software including routines for generating graphical data for providing user interfaces to users. In one embodiment, the user interface engine 213 is a set of instructions executable by the processor 235 to provide the functionality below for generating graphical data for providing the user interfaces. In another embodiment, the user interface engine 213 is stored in the memory 237 and is accessible and executable by the processor 235. In either embodiment, the user interface engine 213 is adapted for cooperation and communication with the processor 235 and other components of the computing device 200 via signal line 234.

In one embodiment, the user interface engine 213 receives instructions from the advertisement engine 211 to generate a graphical interface that displays information associated with one or more products identified on the captured image to the user. In another embodiment, the user interface engine 213 receives instructions from the advertisement engine 211 to display advertisements for products related to the captured image for the user. The user interface engine 213 sends the graphical data to an application (e.g., a browser) in the user device 115 via the communication unit 241 causing the application to display the data including the advertisements on a user interface.

Example Methods and Graphic Representations

Figure 3:
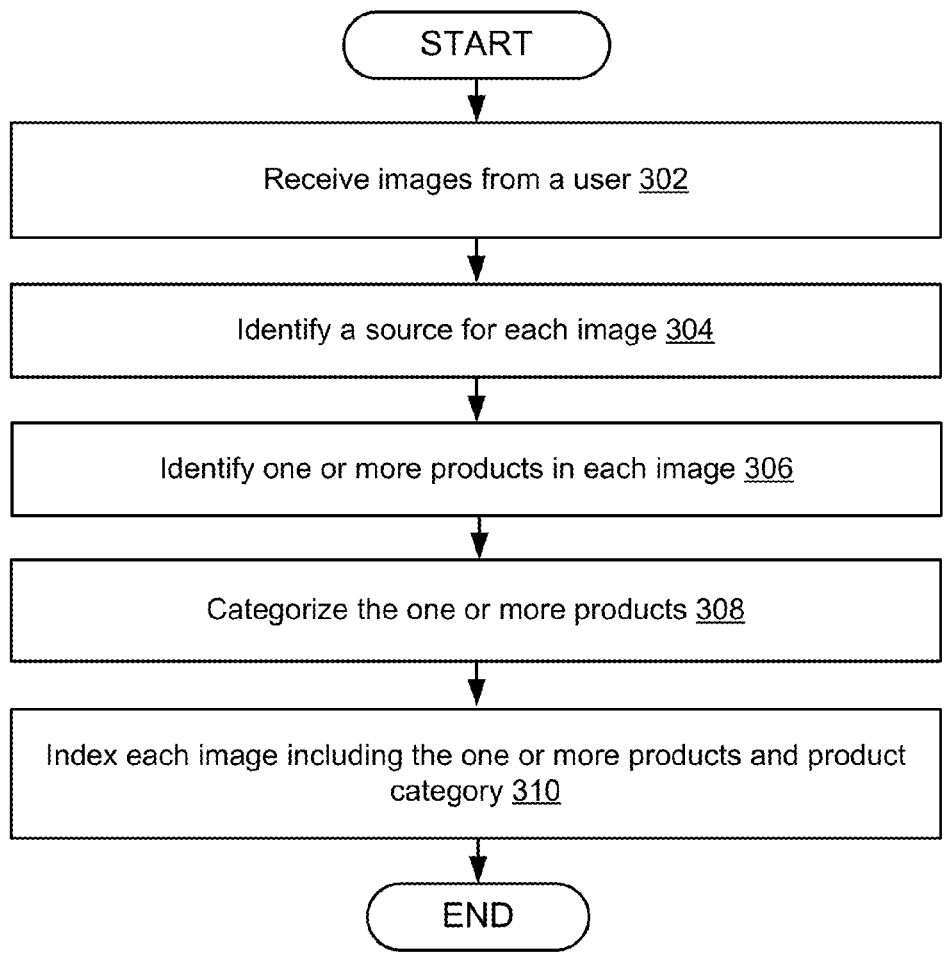
FIG. 3 is a flow diagram illustrating one embodiment of a method for indexing images.

FIG. 3 is a flow diagram 300 of one embodiment of a method for indexing images. The media application 103 includes an image processor 203. The image processor 203 receives 302 images from a user and identifies 304 a source for each image. For example, the image processor 203 receives an image of an actress wearing a designer handbag and identifies that the image is captured from a television program. The image processor 203 identifies 306 one or more products in each image and categorizes 308 the one or more products. For example, the image processor 203 identifies that the handbag worn by the actress in the captured image is Louis Vuitton™ and categorizes the product as a fashion accessory. The image processor 203 indexes 310 each image including the one or more products and product category. For example, the image processor 203 maps each image to a set of values, such as, product name, advertising medium, brand name, genre, etc. in the data storage 243.

Figure 4:
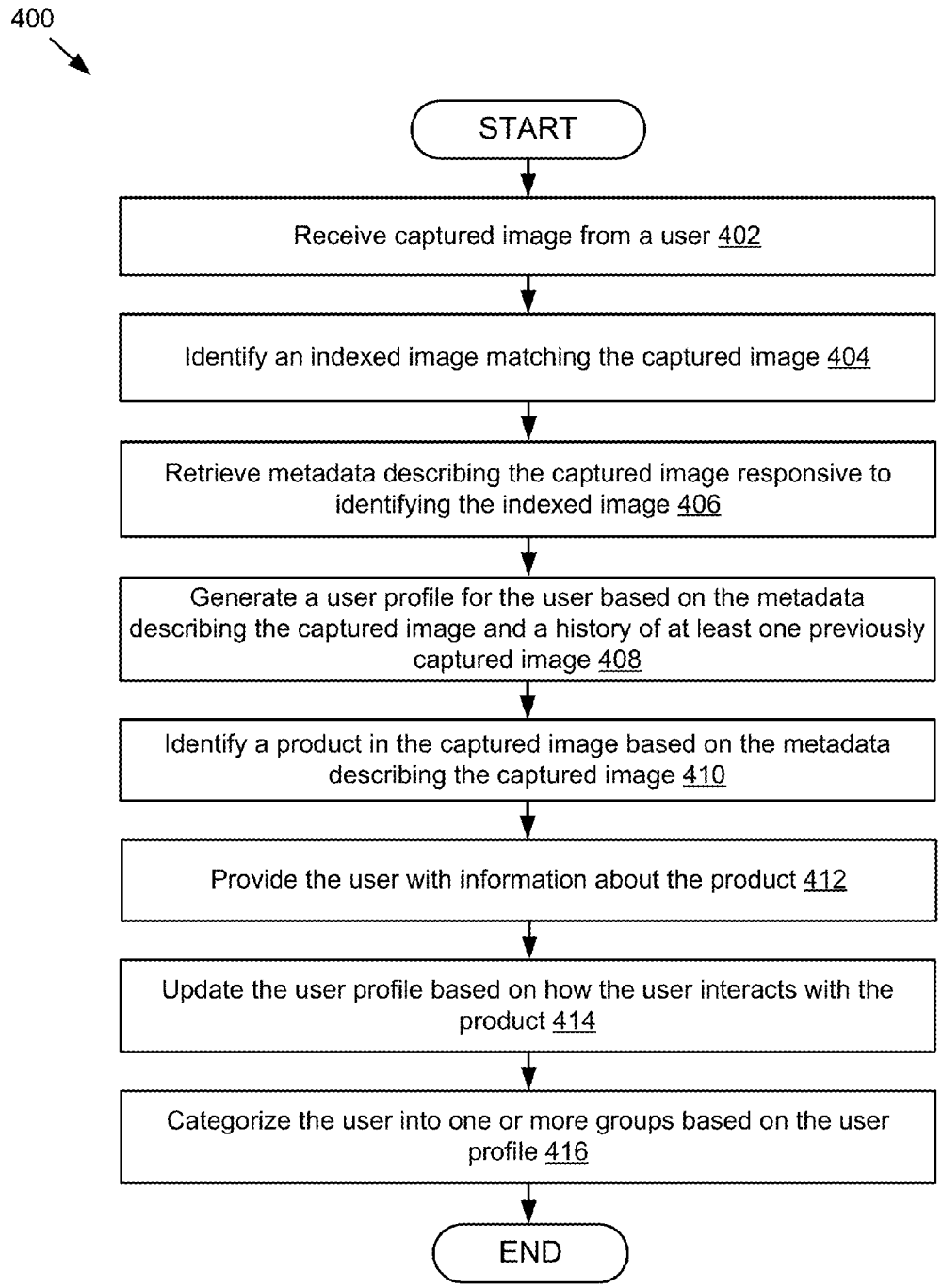
FIG. 4 is a flow diagram illustrating one embodiment of a method for categorizing the users into one or more groups.

FIG. 4 is a flow diagram 400 of one embodiment of a method for categorizing the users into one or more groups. The media application 103 includes a matching engine 205, the user profile engine 207, the grouping engine 209 and the advertisement engine 211. The matching engine 205 receives 402 captured image from a user. For example, the matching engine 205 receives an image captured on a user's smartphone of an actress wearing a pair of earrings on a television drama. In one embodiment, the captured image includes a time and location of capture. In another embodiment, the captured images can be from any advertising medium, video or print. The matching engine 205 identifies 404 an indexed image matching the captured image and retrieves 406 metadata describing the captured image responsive to identifying the indexed image. For example, the matching engine 205 identifies the captured image of the actress in the television drama and associates it with retrieved metadata. The metadata describes that the captured image is from Season 3, Episode 2, broadcast on A2B channel, at 9 PM Eastern Standard Time, identified product in the captured image as Gucci™ earrings, etc. The user profile engine 207 generates 408 a user profile for the user based on the metadata describing the captured image and a history of at least one previously captured image. For example, the user profile engine 207 identifies that the user captures images of actors with fashionable attire and accessories broadcast on television channels based on the metadata of captured images. The user profile engine 207 stores the captured images including metadata in the user profile generated for that user. The advertisement engine 211 identifies 410 a product in the captured image based on the metadata describing the captured image and provides 412 the user with information about the product. For example, the advertisement engine 211 identifies the product Gucci™ earrings in the captured image based on the metadata and retrieves information including the designer, price, store phone number, website address, etc. associated with the earrings and displays the retrieved information on the user's smartphone display. In one embodiment, the retrieved information is displayed as hotspots on the captured image for the user. The user profile engine 207 updates 414 the user profile based on how the user interacts with the product. For example, the user profile engine 207 determines if the user clicked on the hotspots and stores the click history associated with the identified products in the user profile. In another example, if the user buys the advertised products, the user profile engine 207 stores the purchase history associated with the user in the user profile. The grouping engine 209 categorizes 416 the user into one or more groups based on the user profile. For example, since the user is engaged in capturing images relating to fashion and accessories, such as, clothing, earrings, watch, handbag, gloves, sunglasses, etc. the grouping engine 209 categorizes the user in a group interested in fashion.

Figure 5:
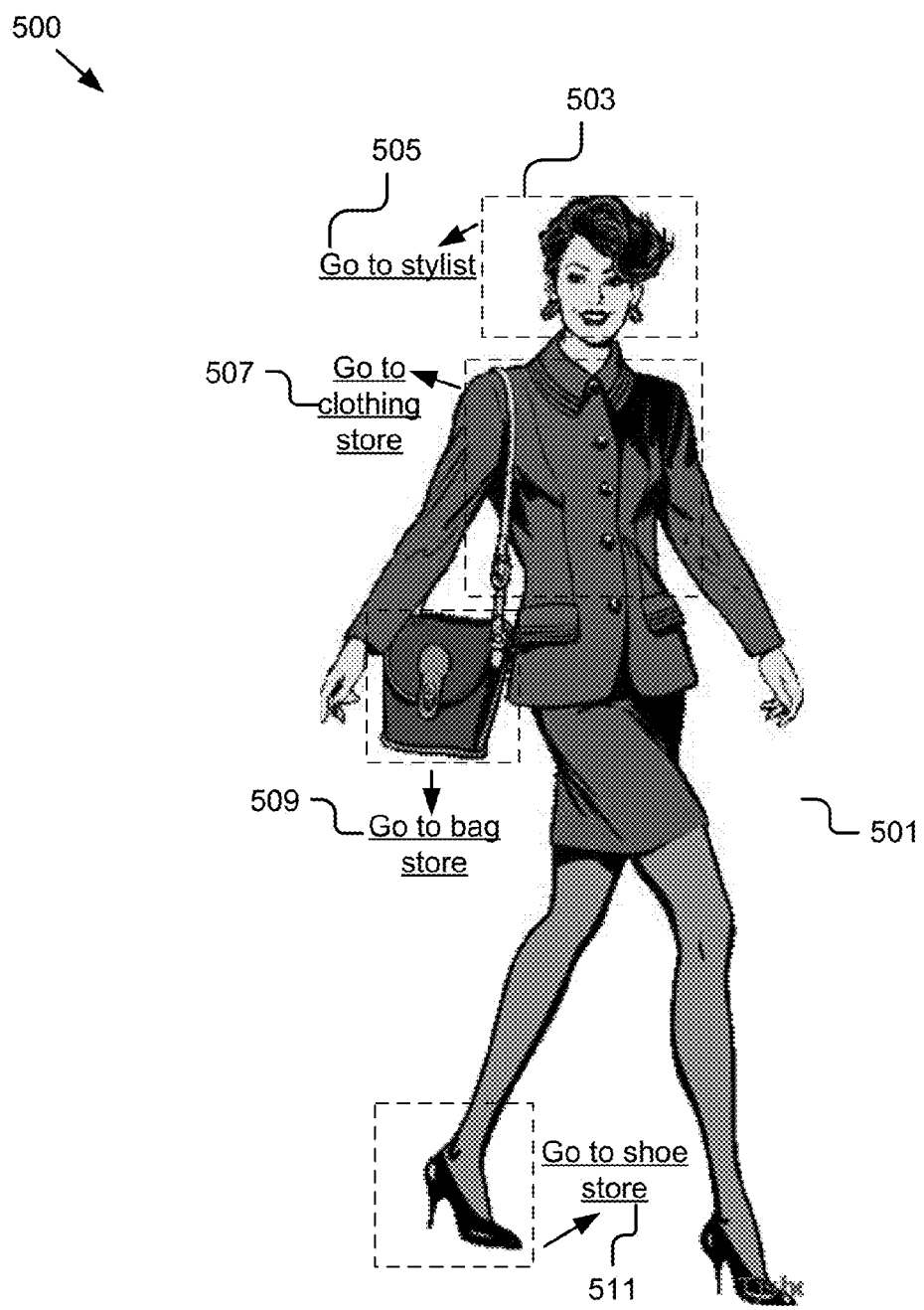
FIG. 5 is a graphical representation of one embodiment that displays information associated with identified products on a captured image.

FIG. 5 is a graphical representation 500 of one embodiment that displays information associated with identified products on a captured image. In one embodiment, the graphical representation 500 can be displayed on a user device 115, for example a smartphone associated with the user capturing the image. In this graphic representation 500, the example image is a captured image 501 of an actress wearing fashion accessories. The graphical representation 500 includes a hotspot 503 embedded on the identified products in the captured image 501. The hotspot 503 also includes a text description 505 for identifying the hotspot. Upon clicking the hotspot 503 the user is taken to the web page of the stylist. In the graphical representation 500, the captured image 501 includes a clothing store hotspot 507 embedded on the blouse of the actress, a handbag store hotspot 509 embedded on the handbag of the actress, and a shoe store hotspot 511 embedded on the shoes of the actress.

Figure 6:
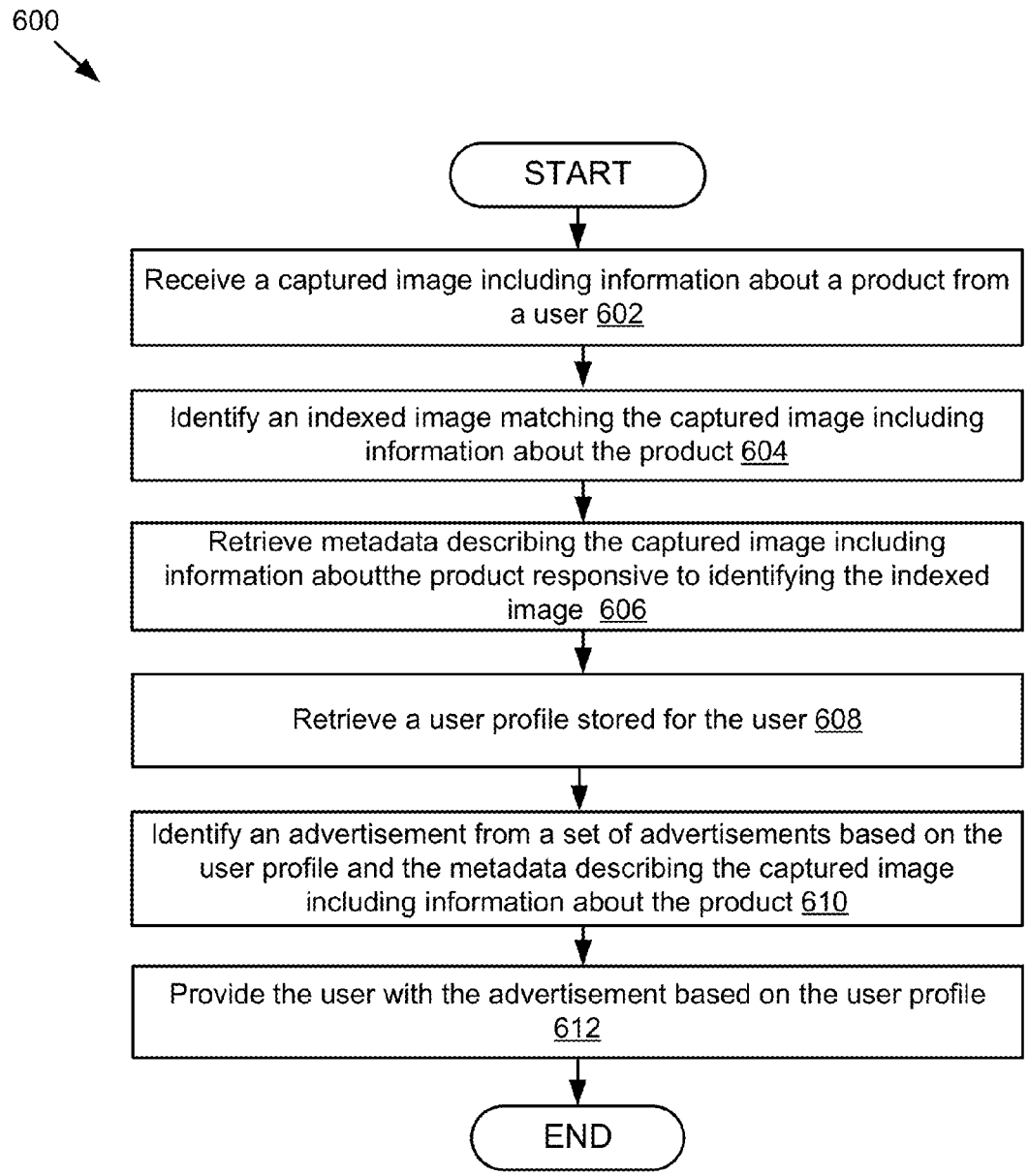
FIG. 6 is a flow diagram illustrating one embodiment of a method for delivering the user with an advertisement.

FIG. 6 is a flow diagram 600 of one embodiment of a method for delivering the user with an advertisement. The media application 103 includes a matching engine 205, the user profile engine 207, and the advertisement engine 211. The matching engine 205 receives 602 a captured image including information about a product from a user. For example, the matching engine 205 receives an image captured on a user's smartphone of a movie shown on a television channel that includes the product itself, information for purchasing the product, etc. In another example, the matching engine 205 receives an image captured on the user's smartphone of an article in a business magazine. The matching engine 205 identifies 604 an indexed image matching the captured image including information about the product and retrieves 606 metadata describing the captured image including information about the product responsive to identifying the indexed image. For example, the matching engine 205 identifies an indexed image matching the captured image from the data storage 243. The metadata describing the captured image could include that the captured image is from XYZ movie broadcast on A2B channel, etc. In another example, the metadata describing the captured image could include that the captured image is from page 6 of Richie business magazine issued in the month of December and the article is titled "Falling gold prices," etc. The user profile engine 207 retrieves 608 a user profile for the user. In one embodiment, the user profile for the user primarily includes user demographics, user interests and product buying habits. The user profile engine 207 stores all the images previously captured by the user including the associated metadata in the user profile. The advertisement engine 211 identifies 610 an advertisement from a set of advertisements based on the user profile and the metadata describing the captured image including information about the product and provides 612 the user with the advertisement based on the user profile. In one embodiment, the advertisement can be opportunistic and contextual to the theme of the captured image. For example, the advertisement engine 211 identifies that the user captured an image of an article titled "Falling gold prices" from the metadata retrieved for the captured image. The advertisement engine 211 selects an advertisement for a gold chain necklace from a designer store based on the context identified for the captured image and displays the advertisement on the user's smartphone.

Figure 7:
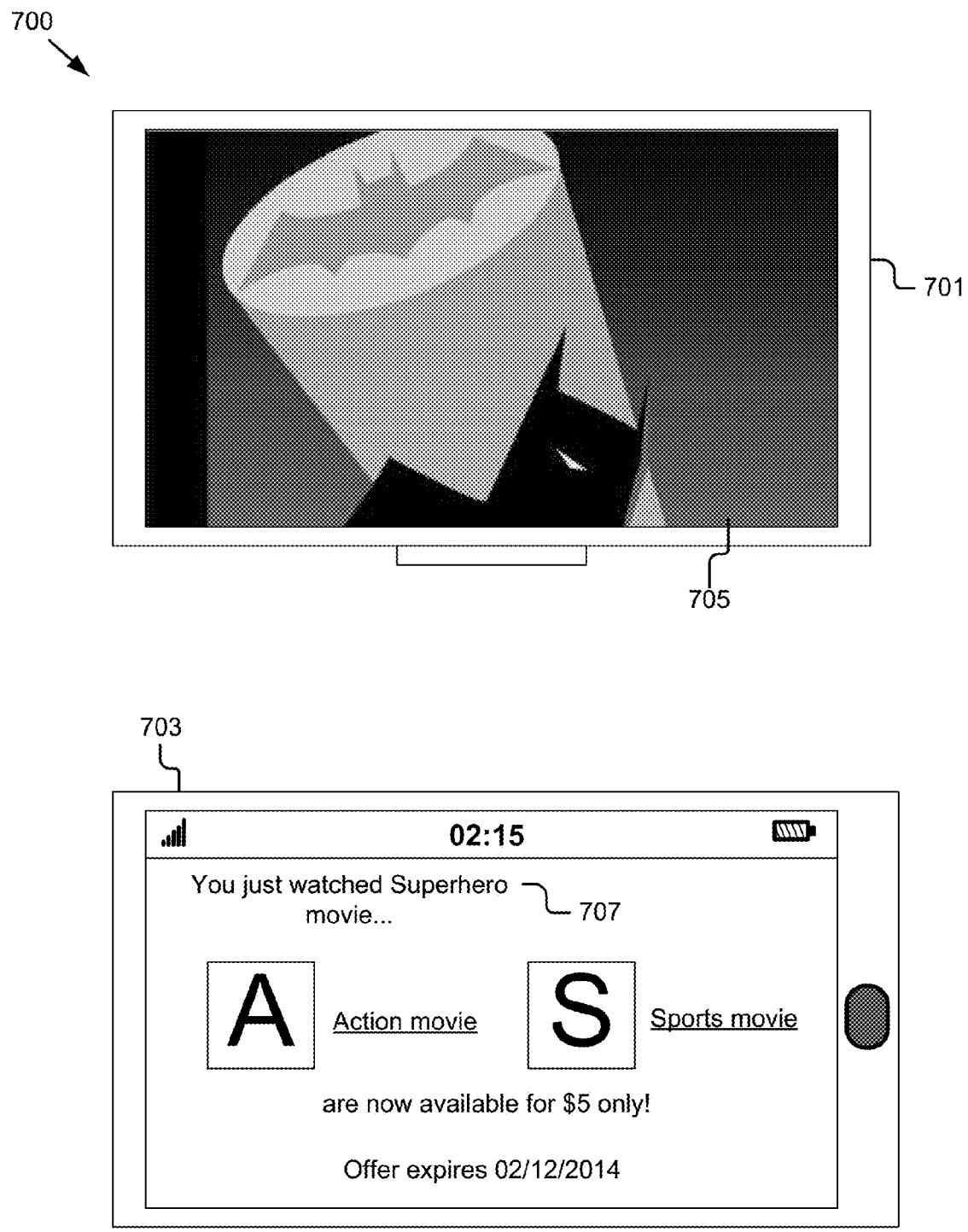
FIG. 7 is a graphical representation of one embodiment for delivering advertisement to the user capturing an image.

FIG. 7 is a graphic representation 700 of one embodiment for delivering an advertisement to the user capturing an image. In the illustrated embodiment, the graphical representation 700 includes a television 701 (i.e., media player 107) and a tablet PC 703 (i.e. user device 115). The user watching a super hero movie on the television 701 captures an image of a climactic scene in the movie 705 using the tablet PC 703. The user is then delivered an advertisement 707 on the tablet 703 on which the user captured the image. The advertisement 707 displays that there are two movies that can be purchased for just $5 with the offer expiring on Jan. 12, 2014.

The foregoing description of the embodiments has been presented for the purposes of illustration and description. It is not intended to be exhaustive or to limit the specification to the precise form disclosed. Many modifications and variations are possible in light of the above teaching. It is intended that the scope of the embodiments be limited not by this detailed description, but rather by the claims of this application. As will be understood by those familiar with the art, the examples may be embodied in other specific forms without departing from the spirit or essential characteristics thereof. Likewise, the particular naming and division of the modules, routines, features, attributes, methodologies and other aspects are not mandatory or significant, and the mechanisms that implement the description or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
receiving, with one or more processors and from a first user device associated with a user, a captured image including information about a product;
identifying, with the one or more processors, an indexed image matching the captured image;
retrieving, with the one or more processors, metadata to associate with the captured image responsive to the indexed image matching the captured image;
retrieving, with the one or more processors, a user profile stored for the user;
determining, with the one or more processors, a first number of times that a first product was advertised to the user before a first purchase of the first product by the user and a second number of times that a second product was advertised to the user before a second purchase of the second product by the user based on analyzing a purchase history in the user profile;
identifying, with the one or more processors, a pattern in the first number of times that the first product was advertised to the user before the first purchase of the first product by the user and the second number of times that the second product was advertised to the user before the second purchase of the second product by the user;

associating, by the one or more processors, the user profile with an adopter category based on a rate of adopting products by the user, the rate of adopting products based on the pattern in the first number of times that the first product was advertised to the user before the first purchase of the first product by the user and the second number of times that the second product was advertised to the user before the second purchase of the second product by the user, wherein the adopter category includes one from a group of early adopters, early majority, late majority and laggards;

identifying, from a set of advertisements, an advertisement based on the adopter category and the associated metadata of the captured image; and providing the advertisement, identified based on the adopter category and the associated metadata of the captured image, for display on a user interface of the first user device.

2. The method of claim 1, wherein the captured image includes content displayed on a second user device and the content being captured by the first user device.

3. The method of claim 1, wherein the captured image is of content displayed on a printed advertising medium and captured on the first user device, wherein the first user device is a mobile device.

4. The method of claim 1, wherein the user profile stored for the user includes age, gender, location, timestamp of at least one previously captured image, metadata of the at least one previously captured image, history of products previously interacted with by the user, history of products previously purchased by the user and time spent by the user shopping for products.

5. The method of claim 1, wherein the associated metadata of the captured image includes a time and location associated with the captured image, a genre of the captured image, a type of advertising medium associated with the captured image, a name of advertising medium associated with the captured image, and a name of the product in the captured image.

6. The method of claim 1, wherein providing the advertisement for display on the user interface of the first user device further comprises selecting a time for delivering the advertisement for effective user engagement, wherein the selected time is a time during an advertisement break associated with content being displayed on a second user device.

7. A system comprising:
one or more processors;
a matching engine stored on a memory and executable by the one or more processors, the matching engine for receiving a captured image including information about a product from a first user device associated with a user, identifying an indexed image matching the captured image and retrieving metadata to associate with the captured image responsive to the indexed image matching the captured image;
a user profile engine stored on the memory and executable by the one or more processors, the user profile engine coupled to the matching engine for retrieving a user profile stored for the user;
a grouping engine stored on the memory and executable by the one or more processors, the grouping engine coupled to the user profile engine for determining a first number of times that a first product was advertised to the user before a first purchase of the first product by the user and a second number of times that a second product was advertised to the user before a second purchase of the second product by the user based on analyzing a purchase history in the user profile, identifying a pattern in the first number of times that the first product was advertised to the user before the first purchase of the first product by the user and the second number of times that the second product was advertised to the user before the second purchase of the second product by the user, and associating the user profile with an adopter category based on a rate of adopting products by the user, the rate of adopting products based on the pattern in the first number of times that the first product was advertised to the user before the first purchase of the first product by the user and the second number of times that the second product was advertised to the user before the second purchase of the second product by the user, wherein the adopter category includes one from a group of early adopters, early majority, late majority and laggards; and
an advertisement engine stored on the memory and executable by the one or more processors, the advertisement engine coupled to the grouping engine and the user profile engine for identifying, from a set of advertisements, an advertisement based on the adopter category and the associated metadata of the captured image, and providing the advertisement, identified based on the adopter category and the associated metadata of the captured image, for display on a user interface of the first user device.

8. The system of claim 7, wherein the captured image includes content displayed on a second user device and the content being captured by the first user device.

9. The system of claim 7, wherein the captured image is of content displayed on a printed advertising medium and captured on the first user device, wherein the first user device is a mobile device.

10. The system of claim 7, wherein providing the advertisement for display on the user interface of the first user device further comprises selecting a time for delivering the advertisement for effective user engagement, wherein the selected time is a time during an advertisement break associated with content being displayed on a second user device.

11. A computer program product comprising a non-transitory computer useable medium including a computer readable program, wherein the computer readable program when executed on a computer causes the computer to:
receive a captured image including information about a product from a first user device associated with a user;
identify an indexed image matching the captured image;
retrieve metadata to associate with the captured image responsive to the indexed image matching the captured image;
retrieve a user profile stored for the user;
determining a first number of times that a first product was advertised to the user before a first purchase of the first product by the user and a second number of times that a second product was advertised to the user before a second purchase of the second product by the user based on analyzing a purchase history in the user profile;
identify a pattern in the first number of times that the first product was advertised to the user before the first purchase of the first product by the user and the second number of times that the second product was advertised to the user before the second purchase of the second product by the user;
associate the user profile with an adopter category based on a rate of adopting products by the user, the rate of adopting products based on the pattern in the first number of times that the first product was advertised to the user before the first purchase of the first product by the user and the second number of times that the second product was advertised to the user before the second purchase of the second product by the user, wherein the adopter category includes one from a group of early adopters, early majority, late majority and laggards;

identify, from a set of advertisements, an advertisement based on the adopter category and the associated metadata of the captured image; and provide the advertisement, identified based on the adopter category and the associated metadata of the captured image, for display on a user interface of the first user device.

12. The computer program product of claim 11, wherein the captured image includes content displayed on a second user device and the content being captured by the first user device.

13. The computer program product of claim 11, wherein the captured image is of content displayed on a printed advertising medium and captured on the first user device, wherein the first user device is a mobile device.

14. The computer program product of claim 11, wherein the computer readable program when executed on the computer causes the computer to provide the advertisement for display on the user interface of the first user device by selecting a time for delivering the advertisement for effective user engagement, wherein the selected time is a time during an advertisement break associated with content being displayed on a second user device.

* * * * *